United States Patent Office 3,358,033
Patented Dec. 12, 1967

3,358,033
PROCESS FOR DEHYDROHALOGENATION OF FLUOROACETONE-HYDROGEN HALIDE COMPLEXES
Louis G. Anello, Basking Ridge, and Anthony W. Yodis, Whippany, N.J., assignors to Allied Chemical Corporation, New York, N.Y., a corporation of New York
No Drawing. Filed Sept. 28, 1964, Ser. No. 399,907
4 Claims. (Cl. 260—593)

ABSTRACT OF THE DISCLOSURE

Process for decomposing fluoroalcohols to produce fluoroacetones and hydrogen halides, which comprises contacting the fluoroalcohol with sulfur trioxide at temperatures above 0° C.

---

This invention relates to a process for removal of hydrogen halides from fluoroacetone-hydrogen halide complexes.

Fluorinated acetones, including hexafluoroacetone, chloropentafluoroacetone and the lower fluorinated chloroacetones, can be prepared in excellent yields by reaction of hexachloroacetone with anhydrous hydrogen fluoride in the presence of catalysts such as dichromium trioxide and chromium trifluoride as disclosed in copending applications Ser. No. 226,438 now abandoned of Louis G. Anello and Cyril Woolf, and Ser. No. 226,439 now Patent No. 3,257,457 of Louis G. Anello, Henry R. Nychka and Cyril Woolf, both filed Sept. 26, 1962.

It has been found that complete separation of the fluorinated acetone product from hydrogen chloride and hydrogen fluoride present in the product mixture by usual methods involving stripping the by-product hydrogen halides from the crude fluoroacetone mixtures followed by distillation, is complicated by the presence of chemically bound complexes or reaction products of the fluoroacetones with hydrogen chloride and hydrogen fluoride. The fluoroacetone complexes which form in this manner from hexafluoroacetone and pentafluorochloroacetone include the fluoroalcohols and the fluoroether listed below:

(1) Hexafluoro-2-chloroisopropanol, B.P. 19° C., M.P. −47° C., from hexafluoroacetone and hydrogen chloride.

$$CF_3COCF_3 + HCl \longrightarrow CF_3-\underset{\underset{Cl}{|}}{\overset{\overset{OH}{|}}{C}}-CF_3$$

(2) Heptafluoroisopropanol, B.P. 14°–16° C., M.P. −56° C., from hexafluoroacetone and hydrogen fluoride.

$$CF_3COCF_3 + HF \longrightarrow CF_3-\underset{\underset{F}{|}}{\overset{\overset{OH}{|}}{C}}-CF_3$$

(3) 1-chlorohexafluoroisopropanol, B.P. 32°–33° C., M.P. −82° C., from pentafluorochloroacetone and hydrogen fluoride.

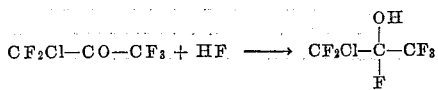

(4) 2-(1-chlorohexafluoroisopropoxy)-1 - chloropentafluoroisopropanol, B.P. −1° C., from pentafluorochloroacetone and hydrogen fluoride.

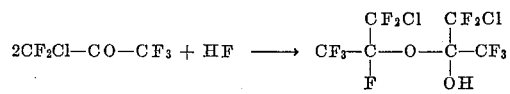

The fluoroacetone complexes thus formed are in equilibrium with the hydrogen halides and with the fluoroacetones, so that reaction mixtures obtained from the above described fluorination process will often contain mixtures of several fluoroacetones, their hydrogen halide complexes and free hydrogen halides, the proportions of each varying considerably with the temperature. At low temperatures the equilibrium is such that the complexes form the major part of the mixture. At higher temperatures, the equilibrium changes and predominant amounts of fluoroacetones and hydrogen halides may be present. However, attempts to completely decompose the complexes by increasing the temperature has proven impracticable.

These complexes occur in forecuts, intermediate cuts, and even in distillation residues obtained upon fractional distillation of the reaction products produced by the fluorination with HF of haloacetones of lower fluorine content than the desired fluoroacetone product(s). Those products include, in addition to these complexes, the desired fluorinated acetone, unreacted HF, and by-product HCl. Whether the complex is a forecut or later fraction of the distillation is of course a function of the relative boiling points of complex with respect to the boiling points of the other separable components of the reaction mixture.

It is an object of the present invention to provide a process for decomposing hydrogen halide-fluoroacetone complexes with liberation of the corresponding fluoroacetone.

Another object of the invention is to provide a process for removal of hydrogen halides from fluoroacetone-hydrogen halide complexes or mixtures thereof.

Still another object of the invention is to provide a process for purification of hexafluoroacetone and chloropentafluoroacetone prepared by the catalytic fluorination of hexachloracetone with anhydrous hydrogen fluoride.

A still further object of the invention is to provide a process for decomposing fluoroacetone-hydrogen halide complexes of the formulas

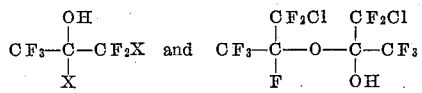

wherein X is a member selected from the group consisting of chlorine and fluorine, to liberate the corresponding fluoroacetone by the subtraction of a single hydrogen halide molecule.

These and other objects are accomplished according to our invention wherein a hydrogen halide-fluoroacetone complex or mixtures of such complexes with fluoroacetones and/or hydrogen halides is contacted with sulfur trioxide at temperatures of at least about 0° C.

The reaction of the complexes with sulfur trioxide dehydrohalogenates the complexes with liberation of the corresponding fluoroacetone and formation of chlorosulfonic acid ($HSO_3Cl$) and/or fluorosulfonic acid ($HSO_3F$). No detectable reaction takes place between the liberated fluoroacetones and the halosulfonic acids formed, so that the purified fluoroacetones are readily removed therefrom as by volatilization or distillation due to the wide differences in boiling points between the fluoroacetones and the halosulfonic acids; $CF_3COCF_3$ boiling at −27° C. to −29° C., $CF_3COCF_2Cl$ boiling at about 7°–11° C., whereas chlorosulfonic acid boils at about 151.5° C., fluorosulfonic acid boils at about 165.5° C.

One mole of sulfur trioxide per mole of hydrogen chloride or hydrogen fluoride to be removed, is sufficient to effect the decomposition, i.e., dehydrohalogenation, of the fluoroacetone complex, but a slight excess of sulfur trioxide can be used with no disadvantage.

The reaction can be carried out in the liquid phase or in the vapor phase. The low boiling points of the fluoroacetones and their complexes make vapor phase operation advantageous for commercial operation without the use of a solvent reaction medium. For liquid phase operation, the reaction is carried out at a temperature below the boiling point of the reaction medium, preferably at temperatures between about 0° C. and about 25° C. In vapor phase operation, temperatures can be considerably higher, limited only by the decomposition temperatures of the fluoroacetones in the presence of $SO_3$, i.e., temperatures of the order of 200–500° C. However, temperatures above about 50° C. are usually not necessary or desirable.

While removal of hydrogen halide by $SO_3$ proceeds slowly at temperatures as low as 0° C., it is preferred to contact the fluoroacetone-hydrogen halide complexes with $SO_3$ at somewhat higher temperatures, for example, at temperatures between about 10° C. and about 25° C. for liquid phase operation, and at temperatures between about 25° C. and about 50° C. in vapor phase operation. Higher temperatures can be used if desired, but are not necessary. In general, temperatures between about 0° C. and about 50° C. are suitable.

Reaction of $SO_3$ and the fluoroacetone-hydrogen halide complexes is rapid, and substantially complete dehydrohalogenation is usually obtained in periods of between about 10 seconds and about 5 minutes.

Our purification process can be carried out batchwise or continuously.

According to one modification of our process, a metal still is charged with fluoroacetones complexed with hydrogen halides. The metal still pot is connected to a dry metal low temperature still. Liquid sulfur trioxide, preferably in slight stoichiometric excess over the hydrogen halides in the mixture, is slowly added, as through a dropping funnel. The still pot is then heated until a reflux is obtained and the scrubbed fluoroacetone is separated from the chloro- and fluorosulfonic acid mixture as by volatilization, followed by distillation.

In another modification of our process, the hydrogen halide-contaminated fluoroacetones can be continuously scrubbed with a solution of $SO_3$ in chloro- or fluorosulfonic acid or a mixture of these acids. In this modification, a reaction vessel is charged with the solution of $SO_3$ in halosulfonic acid and the mixture is circulated through a packed column at about room temperature (Ca 25° C.). Fluoroacetone-hydrogen halide complexes are fed to the pot in which the $SO_3$ concentration of the circulating $SO_3$-halosulfonic acid mixture is maintained at the desired level by continuous addition of $SO_3$. The liberated fluoroketones, after passing through the $SO_3$-halosulfonic acid solution are collected as in ice traps and are distilled to separate the individual members if desired.

In another modification, vapor streams of fluoroacetone-hydrogen halide complex mixtures and gaseous sulfur trioxide may be fed to a reactor, wherein the reaction is thus carried out in the vapor phase with provision for removal of the resulting higher boiling halosulfonic acids as by condensation or other conventional means.

The following specific examples further illustrate our invention. Parts are by weight except as otherwise noted.

*Example 1*

A hexafluoroacetone and pentafluoromonochloroacetone-hydrogen halide complex such as obtained from fractionation of HF fluorination of hexachloroacetone controlled to yield predominantly the five and six fluorine atom substituent perhaloacetone product has an ultimate analysis of:

|  | Grams | Moles |
|---|---|---|
| HF | 30 | 1.5 |
| $CF_3COCF_3$ | 117 | 0.72 |
| $CF_3COCF_2Cl$ | 115 | 0.67 |
| HCl | 30 | 0.82 |
| Total | 292 |  | and has the following approximate composition:

|  | B.P., °C. | Percent by weight |
|---|---|---|
| Hexafluoro-2-chloroisopropanol | 19 | 23.0 |
| Heptafluoroisopropanol | 14–16 | 25.0 |
| 1-chlorohexafluoroisopropanol | 32–33 | 23.0 |
| 2-(1-chlorohexafluoroisopropoxy)-1-chloropentafluoroisopropanol | −1 | 29.0 |

Into 292 parts of this mixture, maintained at 0° C., were slowly added 209 grams (2.6 moles) of liquid $SO_3$ over a period of about 1 hour. The reaction mixture was then distilled and the several fractions were analyzed for hydrogen chloride and hydrogen fluoride with the results shown below:

| Fraction | Head Temp. | Distillate Gms. | Major Components | Percent HCl | Percent HF |
|---|---|---|---|---|---|
| 1 | −23 | 17 | 6FK [1] | 0.013 | 0.080 |
| 2 | 3 | 69 | 6FK+ 5FK [2] | <0.001 | <0.055 |
| 3 | −20 | 77 | 6FK | <0.001 | <0.050 |
| 4 | 0 | 30 | 5FK | 0.003 | 0.05 |
| 5 | 5 | 7 | 5FK | 0.009 | 0.015 |

[1] 6FK=Hexafluoroacetone.
[2] 5FK=Pentafluoromonochloroacetone.

It is apparent from the above that HF and HCl are substantially completely removed by the $SO_3$ treatment.

*Example 2*

A scrubbing system consisting of a 2 liter glass pot connected to a 1.5″ I.D. 36″ glass column packed with Raschig rings was connected to Dry Ice-acetone traps for collection of scrubbed products and to a pump for continuous operation. The pot was then charged with a 1:1 mixture of chlorosulfonic acid and fluorosulfonic acid containing 10% by weight of free $SO_3$ which was circulated through the pot and column at about 25° C. and a rate of 6,000 cc. per hour. The 10% $SO_3$ concentration was maintained by continuous addition of $SO_3$.

Into the above pot was fed a mixture of fluoroacetones and hydrogen halide complexes of the fluoroacetones having the ultimate composition indicated below.

|  | Percent |
|---|---|
| $CF_3COCF_3$ | 6.7 |
| $CF_3COCF_2Cl$ | 87.6 |
| $CF_2ClCOCF_2Cl$ | 0.9 |
| HF | 1.9 |
| HCl | 2.9 |
|  | 100 |

The mixture contained about 4.8% by weight of the fluoroalcohols hexafluoro-2-chloroisopropanol; heptafluoroisopropanol; 1-chlorohexafluoroisopropanol; and 2-(1-chlorohexafluoroisopropoxy) - 1 - chlorpentafluroisopropanol.

The above fluoroacetone-fluoroalcohol mixture was fed to the pot and out through the packed column at the rate of 2 pounds per hour until 20 pounds had been fed. The volume of circulating liquid was kept at a constant level by withdrawing excess acid from the circulating system at the same rate as its volume increased due to formation of chloro- and fluorosulfonic acids and absorption of the fluoroacetones in the acid.

The scrubbed fluoroacetone products were collected in seven glass receivers cooled by a mixture of Dry Ice and acetone. The residual acid content of the scrubbed fluoroacetone mixture was found to be 500–1,000 p.p.m. HF and 1,500–2,500 p.p.m. HCl, mainly due to entrained vapors of chloro- and fluorosulfonic acids. The crude mixture was distilled to separate the fluoroacetones from each other and the major distillate portions were analyzed for acid contents with the results shown below.

|   |   | Scrubbed Product | Distilled Products | |
|---|---|---|---|---|
|   |   |   | CF$_3$COCF$_3$ | CF$_3$COCF$_2$Cl |
| 1 | p.p.m. HF | 1,050 | 105 | 168 |
|   | p.p.m. HCl | 1,605 | 117 | 41 |
| 2 | p.p.m. HF | 525 | 45 | 120 |
|   | p.p.m. HCl | 2,080 | 61 | 60 |
| 3 | p.p.m. HF | 600 | 230 | 156 |
|   | p.p.m. HCl | 2,520 | 230 | 59 |

*Example 3*

Using an apparatus similar to that described in Example 2 above, the pot was charged with a 1:1 mixture of chloro- and fluorosulfonic acids containing 10% by weight concentration of free SO$_3$ which was circulated through the column at about 25° C. and at a rate of 6,000 cc. per hour. The 10% SO$_3$ concentration was maintained during the ensuing run by continuous addition of SO$_3$.

There was fed to the pot the perfluoroacetone hydrogen halide complex having the following ultimate composition:

|   | Percent | Moles |
|---|---|---|
| CF$_3$COCF$_3$ | 84 | 50 |
| HF | 15 | 58 |
| HCl | 0.6 | 2 | in which there was present about 95.0% by weight of heptafluoroisopropanol and hexafluoro-2-chloroisopropanol.

The crude mixture was fed through the pot at a rate of 3 pounds per hour until 10 pounds had been passed through. The scrubbed product was collected as described in Example 2 and was analyzed for residual acid content, and found to contain 530 p.p.m. HF, 300 p.p.m. HCl.

The fluorinated acetones have well established utilities. Thus hexafluoroacetone and pentafluorochloroacetone are useful in the preparation of trifluoroacetic acid which in turn is useful as an esterification catalyst and as a solvent for cellulose.

While the above describes the preferred embodiments of the invention, it will be understood that departures can be made therefrom within the scope of the specifications and claims.

We claim:

1. The process for decomposing compounds selected from the group consisting of

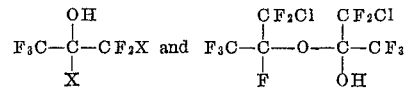

and mixtures thereof, wherein X is a member selected from the group consisting of chlorine and fluorine, which comprises contacting said compound with sulfur trioxide at temperatures between about 0° C. and about 500° C.

2. The process for removing hydrogen halides from compounds selected from the group consisting of

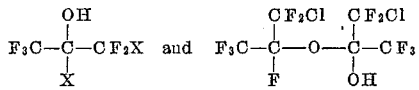

and mixtures thereof, wherein X is a member selected from the group consisting of chlorine and fluorine, which comprises contacting said compound at a temperature between about 0° C. and about 500° C. with sulfur trioxide and separating the resulting fluoroacetone of the formula

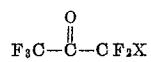

wherein X represents chlorine or fluorine, from the mixture by volatilization.

3. The process for removing hydrogen halides from compounds selected from the group consisting of

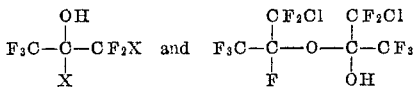

and mixtures thereof, wherein X is a member selected from the group consisting of chlorine and fluorine, which comprises dissolving said compound in a halosulfonic acid selected from the group consisting of chlorosulfonic acid and fluorosulfonic acid, contacting said compound with sulfur trioxide at temperatures between about 0° C. and about 25° C. in the presence of said halosulfonic acid and separating the resulting liberated fluoroacetone of the formula

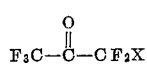

wherein X represents chlorine or fluorine, from the halosulfonic acid by volatilization.

4. The process for purifying a mixture of fluoroacetones contaminated with hydrogen halides and compounds selected from the group consisting of

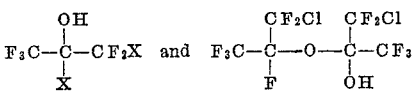

and mixtures thereof, wherein X is a member selected from the group consisting of chlorine and fluorine, which comprises contacting said mixture at temperatures between about 0° C. and about 50° C. with sulfur trioxide, separating the resulting fluoroacetone of the formula

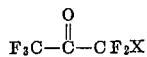

wherein X represents chlorine or fluorine, from the mixture by volatilization, and subjecting the fluoroacetones thus recovered to distillation.

References Cited

UNITED STATES PATENTS 3,238,241   3/1966   Hauptschein et al. _____ 260—593

LEON ZITVER, *Primary Examiner.*

M. JACOB, *Assistant Examiner.*